(12) United States Patent
Beckman et al.

(10) Patent No.: US 9,374,175 B2
(45) Date of Patent: Jun. 21, 2016

(54) JOINT SPATIAL PROCESSING FOR SPACE FREQUENCY BLOCK CODING AND/OR NON SPACE FREQUENCY BLOCK CODING CHANNELS

(71) Applicant: QUALCOMM Incorporated, San Diego, CA (US)

(72) Inventors: James Edward Beckman, La Jolla, CA (US); Yuanning Yu, Freemont, CA (US); Zhifei Fan, San Diego, CA (US); Tao Luo, San Diego, CA (US)

(73) Assignee: Qualcomm Incorporated, San Diego, TX (US)

( * ) Notice: Subject to any disclaimer, the term of this patent is extended or adjusted under 35 U.S.C. 154(b) by 103 days.

(21) Appl. No.: 14/300,058

(22) Filed: Jun. 9, 2014

(65) Prior Publication Data

US 2015/0358089 A1 Dec. 10, 2015

(51) Int. Cl.
| | |
|---|---|
| H04B 15/00 | (2006.01) |
| H04W 72/04 | (2009.01) |
| H04B 7/04 | (2006.01) |
| H04B 7/02 | (2006.01) |
| H04L 1/06 | (2006.01) |
| H04L 25/03 | (2006.01) |
| H04W 24/02 | (2009.01) |

(52) U.S. Cl.
CPC .............. *H04B 15/00* (2013.01); *H04B 7/02* (2013.01); *H04B 7/0413* (2013.01); *H04L 1/06* (2013.01); *H04L 25/03* (2013.01); *H04W 72/0453* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 2006/0126568 A1* | 6/2006 | Pan | H04B 1/71052 370/335 |
| 2008/0279263 A1* | 11/2008 | Haghighat | H04L 1/0606 375/219 |
| 2010/0035555 A1* | 2/2010 | Bala | H04B 7/024 455/63.1 |
| 2010/0104037 A1 | 4/2010 | Joengren | |
| 2011/0019715 A1* | 1/2011 | Brisebois | H04B 7/0626 375/130 |
| 2013/0114451 A1* | 5/2013 | Al-Dhahir | H04B 7/0854 370/252 |
| 2014/0010334 A1 | 1/2014 | Kotzsch | |
| 2014/0044107 A1 | 2/2014 | Jacob | |
| 2014/0072067 A1 | 3/2014 | Yu et al. | |
| 2014/0098773 A1 | 4/2014 | Yoo et al. | |
| 2014/0112404 A1 | 4/2014 | Eder et al. | |
| 2014/0133523 A1 | 5/2014 | Xu et al. | |

OTHER PUBLICATIONS

International Search Report and Written Opinion—PCT/US2014/041734—ISA/EPO—Jan. 22, 2015.

* cited by examiner

*Primary Examiner* — Candal Elpenord
(74) *Attorney, Agent, or Firm* — Patterson & Sheridan, L.L.P.

(57) ABSTRACT

Certain aspects of the present disclosure relate to methods and apparatus that may be used to perform joint spatial processing for space frequency block coding and/or non-space frequency block coding channels in a wireless communications system. In aspects, apparatus and methods are provided for wireless communications, comprising receiving a signal from a serving cell and zero or more interfering cells, and processing the received signal, wherein the processing includes joint processing of at least two Resource Elements (REs), selected to conform to a Space Frequency Block Coding (SFBC) scheme in which transmitted data is modulated across two REs, to detect an interfering cell signal and canceling of the detected interfering cell signal from the received signal.

18 Claims, 10 Drawing Sheets

JOINT SPATIAL PROCESSING FOR SPACE FREQUENCY BLOCK CODING AND/OR NON SPACE FREQUENCY BLOCK CODING CHANNELS

BACKGROUND

1. Field of the Disclosure

Certain aspects of the present disclosure generally relate to wireless communications and, more particularly, to a joint spatial processing algorithm for Space Frequency Block Coding (SFBC) and/or non Space Frequency Block Coding channels.

2. Description of Related Art

In a transmitter of all modern wireless communication links, an output sequence of bits from an error correcting code can be mapped onto a sequence of complex modulation symbols. These symbols can be then used to create a waveform suitable for transmission across a wireless channel. In general, the symbols can be mapped to various transmit locations in frequency, time, and space.

On the receive side, one of the tasks can be to make inferences about the encoder output sequence based on the received symbols, which are generally corrupted by noise and scaled by a (known) complex channel, which generally refers to conditions of the physical transmission medium, e.g., interference in the transmission frequency during the time of the transmission. When the transmit symbols couple in the transmission, as generally occurs when multiple transmit antennas are used to transmit independent spatial streams over identical time/frequency locations, this demapping operation is generally required to account for all of the interfering streams when making (soft) decisions about a stream of interest.

This represents a general framework for joint demapping, in which certain aspects of the present disclosure may be utilized.

SUMMARY

Certain aspects of the present disclosure provide apparatus and techniques for wireless communications, for example, by a user equipment. The techniques generally include receiving a signal from a serving cell and zero or more interfering cells, generating a joint channel matrix from the signal, wherein the matrix accommodates a signal in which at least some data is transmitted using Space Frequency Block Coding (SFBC) in which transmitted data is modulated across two Resource Elements (REs), and performing joint spatial processing of the signal using the joint channel matrix.

Certain aspects of the present disclosure provide apparatus and techniques for wireless communications, for example, by a user equipment. The techniques generally include receiving a signal from a serving cell and zero or more interfering cells and processing the received signal to detect an interfering cell signal, wherein the processing includes joint processing of at least two Resource Elements (REs), selected to conform to a Space Frequency Block Coding (SFBC) scheme in which transmitted data is modulated across two REs, and canceling of the detected interfering cell signal from the received signal.

The techniques may be embodied in methods, apparatuses, and computer program products.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Space Frequency Block Coding (SFBC) in LTE modulates the data to be transmitted across two Resource Elements (REs). A device using SFBC combines the data of two REs into a single modulation symbol, and transmits the resulting symbol in two consecutive REs. Details of this combination and modulation are described below. A serving cell may transmit to a UE either with SFBC precoding or non-SFBC precoding. A UE may receive interference from an interfering cell transmitting either with SFBC precoding or non-SFBC precoding. Linear operations to jointly process two REs of a received signal (e.g., SFBC and/or non-SFBC) and significantly improve receiver demodulation performance are described in aspects of the present disclosure. A UE performing the disclosed operations may have improved performance in receiving SFBC and/or non-SFBC signals over a UE which uses other techniques in receiving the same SFBC and/or non-SFBC signals.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Orthogonal Frequency Division Multiplexing (OFDM) networks, Time Division Multiple Access (TDMA) networks, Frequency Division Multiple Access (FDMA) networks, Orthogonal FDMA (OFDMA) networks, Single-Carrier FDMA (SC-FDMA) networks, Code Division Multiple Access (CDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16 (e.g., WiMAX (Worldwide Interoperability for Microwave Access)), IEEE 802.20, Flash-OFDM®, etc. UTRA, E-UTRA, and GSM are part of Universal Mobile Telecommunication System (UMTS). Long Term Evolution (LTE) and Long Term Evolution Advanced (LTE-A) are upcoming releases of UMTS that use E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). CDMA2000 is described in documents from an organization named "3rd Generation Partnership Project 2" (3GPP2). These various radio technologies and standards are known in the art. For clarity, certain aspects of the techniques are described below for LTE and LTE-A.

The teachings herein may be incorporated into (e.g., implemented within or performed by) a variety of wired or wireless apparatuses (e.g., nodes). In some aspects a node comprises a wireless node. Such wireless node may provide, for example, connectivity for or to a network (e.g., a wide area network such as the Internet or a cellular network) via a wired or wireless communication link. In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some implementations an access point may comprise a set top box kiosk, a media center, or any other suitable device that is configured to communicate via a wireless or wired medium.

An access terminal ("AT") may comprise, be implemented as, or known as an access terminal, a subscriber station, a subscriber unit, a mobile station, a remote station, a remote terminal, a user terminal, a user agent, a user device, user equipment (UE), a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flip-cam, a security video camera, a digital video recorder (DVR), a global positioning system device, or any other suitable device that is configured to communicate via a wireless or wired medium.

Figure 1:
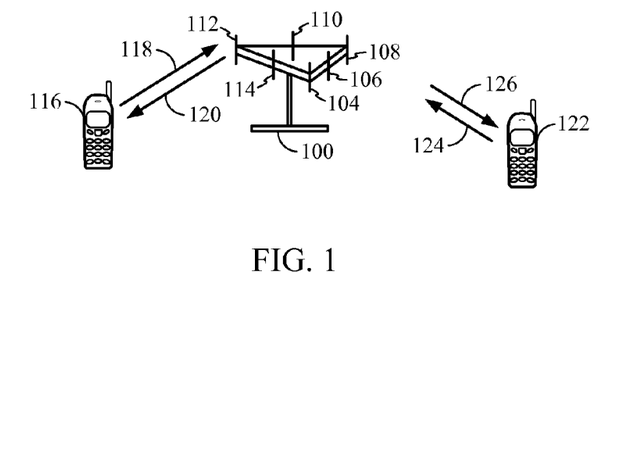
FIG. 1 illustrates an example wireless communication system in accordance with certain aspects of the present disclosure.

FIG. 1 illustrates an example multiple access wireless communication system, in which aspects of the present disclosure may be utilized.

The wireless communication system from FIG. 1 may be a wireless mobile broadband system based on Orthogonal Frequency Division Multiplexing (OFDM). An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access point. In one aspect of the present disclosure each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

In aspects of the present disclosure, the proposed joint demodulation using MLM and/or a two-step de-mapping algorithm may be performed at the access terminals 116 and 122 from FIG. 1. In another aspect, the proposed algorithm may be performed at the access point 100. Certain aspects of the present disclosure provide methods and apparatus for joint spatial processing of Space Frequency Block Coding (SFBC) and/or non Space Frequency Block Coding channels. SFBC channels in this context refers to the signals received in the two REs of an SFBC signal. The two REs may be jointly processed regardless of whether the REs are an SFBC signal, according to aspects of the present disclosure.

Certain aspects of the present disclosure support joint demodulation using max log MAP (MLM), where MAP means maximum a-posteriori probability. Certain aspects of the present disclosure support a two-step joint de-mapping algorithm for determining log-likelihood ratio (LLR) of bits associated with a received multiple-input multiple-output (MIMO) signal. The first action of the disclosed detection algorithm may comprise applying a linear minimum mean square error (LMMSE) based estimation to form soft symbol estimates of symbols being transmitted. The next action may comprise utilization of the LMMSE-based soft symbol estimates to form a set of constellation points of a stream interfering to a stream of interest. These candidate constellation points may be then subtracted from the received MIMO signal in order to improve computations of bit LLRs associated with the stream of interest.

Figure 2:
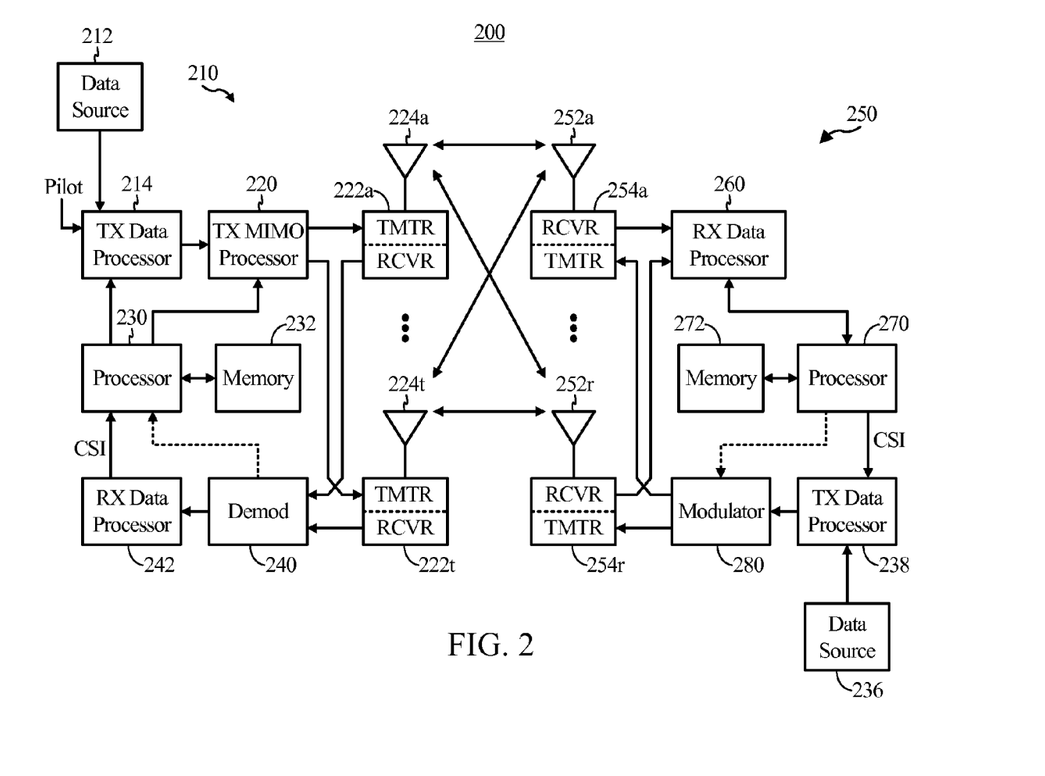
FIG. 2 illustrates a block diagram of an access point and a user terminal in accordance with certain aspects of the present disclosure.

FIG. 2 illustrates a block diagram of an aspect of a transmitter system 210 (e.g., also known as the access point) and a receiver system 250 (e.g., also known as the access terminal) in a MIMO system 200. At the transmitter system 210, traffic data for a number of data streams is provided from a data source 212 to a transmit (TX) data processor 214. In one aspect of the present disclosure, the aforementioned two-step joint de-mapping algorithm for computing bit LLRs based on LMMSE detection and sphere decoding may be performed at the transmitter system 210, e.g., at the processor 230. In another aspect, the proposed two-step de-mapping algorithm may be performed at the receiver system 250, e.g., at the processor 270. In aspects of the present disclosure, the aforementioned methods for joint spatial processing algorithm for Space Frequency Block Coding (SFBC) and/or non Space Frequency Block Coding channels may be performed at the receiver system 250, e.g., at the processor 270 and/or other processors and modules at receiver system 250.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Figure 3:
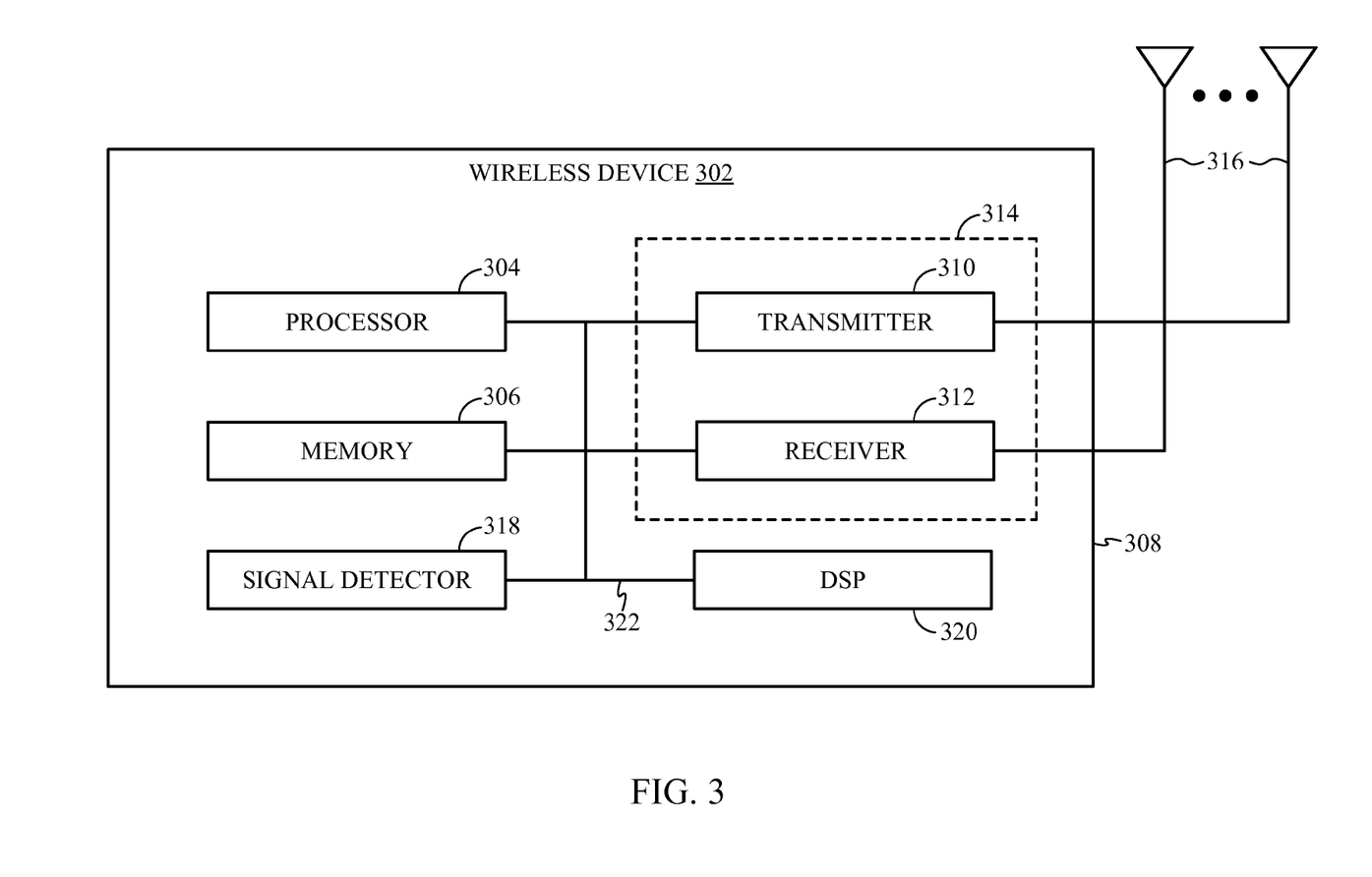
FIG. 3 illustrates a block diagram of an example wireless device in accordance with certain aspects of the present disclosure.

FIG. 3 illustrates various components that may be utilized in a wireless device 302 that may be employed within the wireless communication system from FIG. 1. The wireless device 302 is an example of a device that may be configured to implement the various methods described herein. The wireless device 302 may be an access point 100 from FIG. 1 or any of access terminals 116, 122.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

According to certain aspects of the present disclosure, the aforementioned joint spatial processing algorithm for Space Frequency Block Coding (SFBC) and/or non Space Frequency Block Coding channels, joint demodulation using MLM and/or two-step joint de-mapping algorithm for computing bit LLRs based on LMMSE detection and sphere decoding may be performed at the wireless device 302, e.g., at the processor 304. In one aspect, the wireless device 302 may operate as an access terminal. In another aspect, the wireless device 302 may operate as a base station.

The various components of the wireless device 302 may be coupled together by a bus system 322, which may include a power bus, a control signal bus, and a status signal bus in addition to a data bus.

Joint Demodulation and/or Interference Suppression with MLM

Certain aspects of the present disclosure relate to a technique that may be used to perform joint demodulation and/or interference suppression in wireless communications systems.

In some cases, an optimal receiver in an interference environment will jointly demodulate both the serving streams and interference streams. The challenge for joint demodulation is that the optimal receiver's (e.g., a MAP receiver) complexity grows exponentially with the number of streams. According to certain aspects of the present disclosure, joint demodulation using MLM is described.

According to certain aspects of the present disclosure, wireless communications may be mathematically modeled with a set of matrix equations. In the matrix equations, channel generally refers to conditions of the physical transmission medium, e.g., interference or fading in the transmission frequency observed by the receiver during the time of the transmission. In wireless communications involving multiple frequencies (e.g., an OFDM system), the channel may be modeled by a matrix of values, each value corresponding to conditions in one frequency at a particular instant of time. According to these aspects, y may represent the received data vector, H may represent the joint (e.g., serving and interfering) channel matrix (e.g., a matrix combining the observed channel of the serving transmitter and the observed channel of the interfering transmitter), x may represent the joint transmitted data vector, and n may represent a received noise vector. The relationship between the received signal, joint channel, transmitted signal, and noise may then be expressed by the equation y=Hx+n.

Each element in the vector x belongs to a discrete signal constellation such as QPSK, 16-QPSK, 64-QAM or 256-QAM. For example, in LTE release 11, the maximum constellation size is 64-QAM, which means each element in x has up to 6 bits, which corresponds to 64 hypotheses per stream.

According to aspects of the present disclosure, a receiver (e.g., a UE) may receive a signal including $N_{serve}$ signal streams and $N_{int}$ interfering streams. The receiver may have $N_{rx}$ receiver antennas for demodulation. For example, a receiver could receive a signal having a joint channel with $N_{rx}=2$, $N_{serve}=1$ and $N_{int}=1$.

Figure 4:
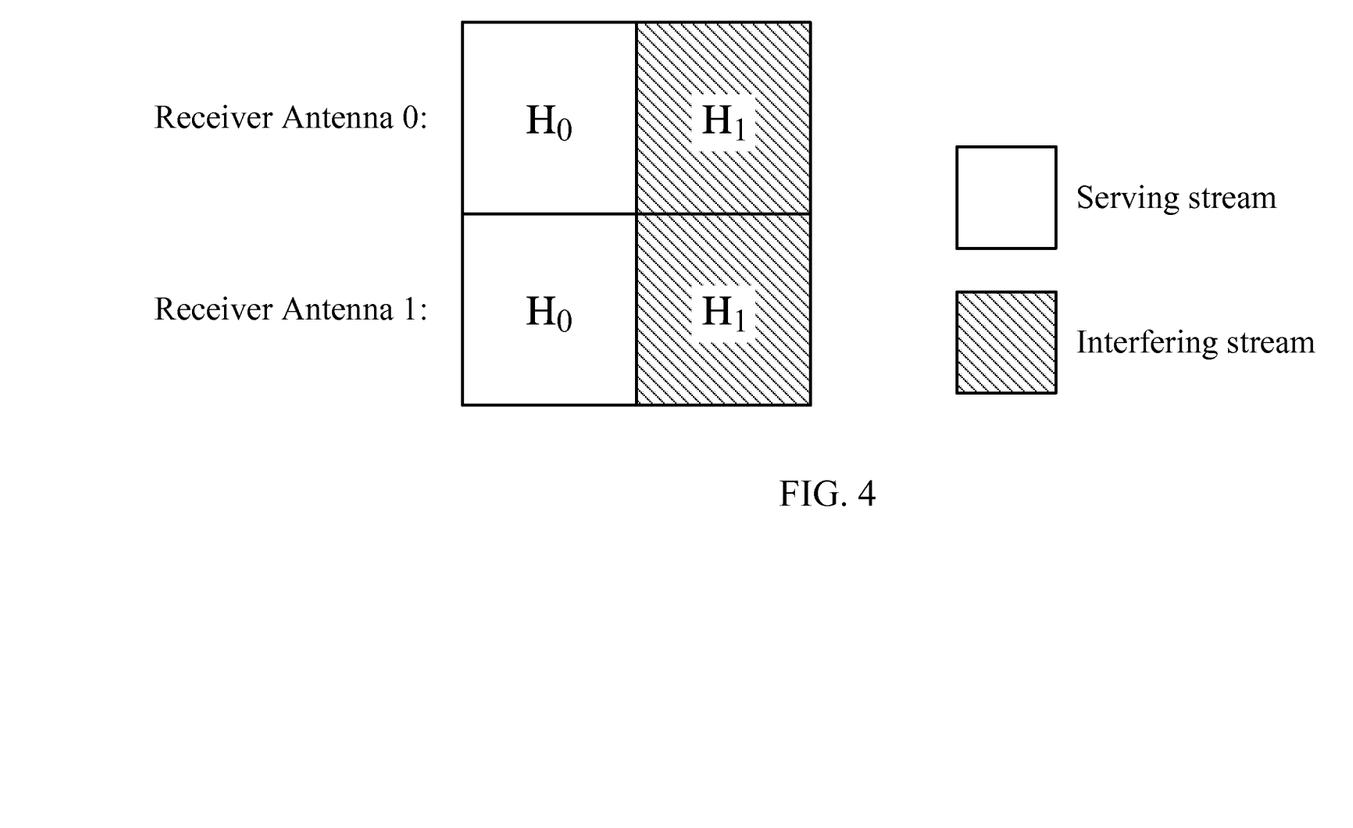
FIG. 4 illustrates an example joint decoding scenario, in which aspects of the present disclosure may be applied.

FIG. 4 illustrates an example of a joint channel matrix for a receiver with two antennas receiving a signal including a serving stream (e.g., from a serving cell) and an interfering stream (e.g., from an interfering cell). The matrix has two rows and two columns, with each row corresponding to one of the antennas and each column corresponding to one of the received streams. The channel matrix cell values are based on the channel state between the receiver and each of the transmitters (e.g., the serving cell and the interfering cell).

In joint demodulation, the MAP receiver has optimal performance and requires evaluating the likelihood of every possible hypothesis. However, MAP isn't feasible for MIMO with $N_{serve}$ serving streams and $N_{int}$ interfering streams since it would require evaluating $64^{N_{serve}+N_{int}}$ hypotheses for 64-QAM. A method which approaches the optimal MAP performance with reasonable complexity is therefore desired.

An LMMSE (Least Minimum Mean Square Error) receiver, which linearly estimates x given y and the joint channel H, could be used. However, performance of an LMMSE receiver is significantly degraded compared to the optimal MAP receiver.

According to aspects of the present disclosure, a method which uses MLM to approach the optimal MAP performance with very reasonable complexity is described.

Example Joint Demodulation Mechanism

In many cases, joint demodulation with a MLM may provide most of the performance benefits of MAP with significantly lower complexity. MLM reduces complexity by only evaluating the most likely hypothesis for at least one stream in a process called "slicing." Solving for a component of the transmitted data vector x may be referred to as a layer of the solution. Evaluating only the most likely hypothesis for a component is slicing through that layer of the solution. For example, performing joint demodulation with a MLM receiver on a 64-QAM signal including 1 serving stream and 1 interfering stream involves calculating significantly fewer exponentials than all 4,096 exponentials required to be calculated when using a MAP receiver to receive the same signal.

In many cases, it may be shown that MLM very closely approximates MAP performance. MLM is the maximum likelihood approximation of MAP where at least one layer is sliced, meaning that the most likely hypothesis is used for that layer. In general, it may be shown that MLM significantly outperforms an LMMSE receiver in many cases.

According to certain aspects of the present disclosure, a max log MAP (MLM) receiver may utilize an algorithm in receiving a signal. As the objective of the receiver is to determine the transmitted data, an objective for an algorithm may be to solve for the bit likelihoods of x given y, H and the unknown n (noise). An MLM receiver may utilize the bit likelihoods to determine the transmitted data.

An exemplary algorithm used by an MLM receiver (e.g., a UE equipped with an MLM receiver) may be described as follows. The MLM receiver may record y, which is the received signal, in order to use in performing calculations as part of the algorithm. The MLM receiver may then estimate H, which combines the channel corresponding to the $N_{serve}$ serving streams and $N_{int}$ interfering streams. The MLM receiver may then solve for $LLR(b_{s,k})$, which is the bit log likelihood ratio of $b_{s,k}$ where k is the bit index and s is the stream index of a serving stream. An MLM receiver may treat x as a vector with each component belonging to a discrete set denoted $Q_0 \ldots Q_{N_{serve}-1}$. The discrete set could be QPSK, 16-QAM, 64-QAM or higher M-QAM. For example, the set could be the QPSK constellation $$\left( \frac{1}{\sqrt{2}} + \frac{1}{\sqrt{2}}j, \frac{1}{\sqrt{2}} - \frac{1}{\sqrt{2}}j, -\frac{1}{\sqrt{2}} + \frac{1}{\sqrt{2}}j, -\frac{1}{\sqrt{2}} - \frac{1}{\sqrt{2}}j \right).$$

The bit log likelihood ratio may be given by the formula:

$$LLR(b_{s,k}) = \log\left(\frac{Pr(b_{s,k}=0)}{Pr(b_{s,k}=1)}\right)$$

where Pr is the probability function, e.g., $Pr(b_{s,k}=0)$ is the probability that bit k of stream s is 0. Solving for a component of x may be referred to as a layer of the solution. For example, an MLM receiver may select the most likely hypothesis, which is the largest exponential for at least one of the layers, in a process referred to as slicing. Slicing may reduce the complexity by a factor equal to the size of the constellation, since only one hypothesis is evaluated for that stream. For example, for the QPSK constellation described above, a 4 to 1 reduction in complexity may be achieved.

According to certain aspects of the present disclosure, various approximations may further reduce complexity for MLM. These approximations may include calculating and using only a limited number of the remaining exponentials, or using numerical approximations for some exponentials, rather than calculating each exponential explicitly.

According to certain aspects of the present disclosure, complexity for an MLM receiver may be further reduced by only solving $LLR(b_{s,k})$ for the serving streams, rather than for all streams. As the receiver may only be interested in the serving stream, solving LLR for the interfering streams may be a waste of the receiver's resources (e.g., processing capacity or battery power).

Figure 5:
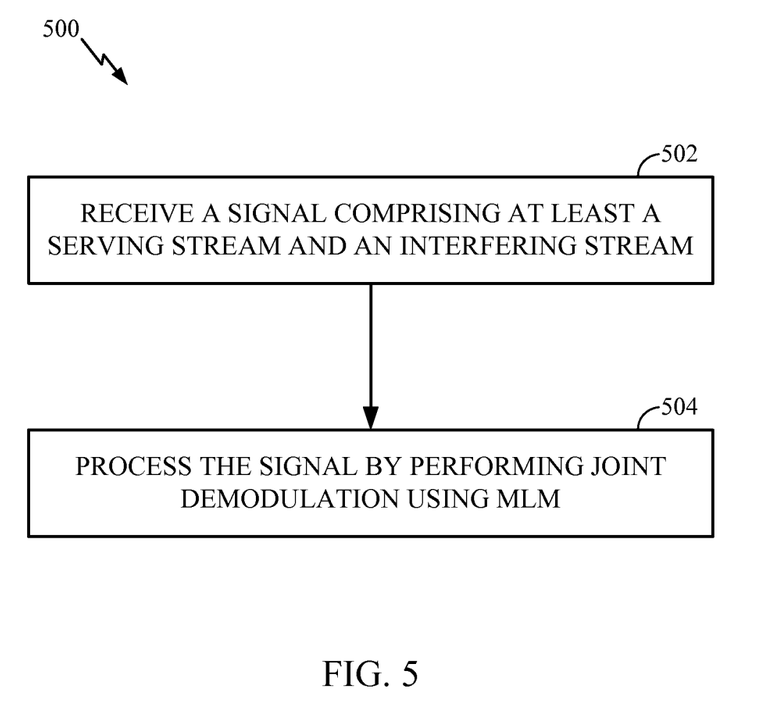
FIG. 5 is a functional block diagram conceptually illustrating example blocks that may be performed at a receiver of a wireless system in accordance with certain aspects of the present disclosure.

FIG. 5 is a functional block diagram conceptually illustrating example operations 500 that may be performed at a receiver in accordance with certain aspects of the present disclosure. Operations 500 may be performed by the receiver system 250 and/or transmitter system 210 shown in FIG. 2. For example, the processor 270 of the receiver system 250 may direct the receiver system in performing the operations illustrated in FIG. 5. In another example, the processor 230 of the transmitter system 210 may direct the transmitter system in performing the operations illustrated in FIG. 5. The wireless device 302 from FIG. 3 may also perform the operations 500, and may be directed in so doing by the processor 304.

The operations may begin, at block 502, by receiving a signal comprising at least a serving stream and an interfering stream. At block 504, the signal may be processed by performing joint demodulation using MLM.

According to aspects of the present disclosure, a receiver may receive a signal including an interfering stream and a serving cell stream, perform symbol level interference cancellation (IC) of the interfering stream, and then demodulate and decode the serving cell stream. For example, a UE may receive a signal including a serving cell's signal and an interfering cell's signal. In the example, the UE may estimate the channel from the interfering cell, estimate a symbol in the interfering cell's signal, cancel the estimated symbol from the received signal, and then demodulate and decode the remaining portion of the received signal to determine a data symbol transmitted by the UE's serving cell.

Joint Spatial Processing for Space Frequency Block Coding and/or Non Space Frequency Block Coding Channels Space Frequency Block Coding (SFBC) in LTE modulates the data to be transmitted across two Resource Elements (REs). A serving cell may transmit to a UE either with SFBC precoding or non-SFBC precoding. A UE may receive interference from an interfering cell transmitting either with SFBC precoding or non-SFBC precoding. According to certain aspects, a UE may use linear operations to jointly process a plurality of REs, for example, the two REs, and significantly improve receiver demodulation performance.

SFBC uses a precoding matrix at the eNodeB in generating symbols transmitted in the two REs, where $$\begin{vmatrix} p^{(0)}(0) & p^{(0)}(1) \\ p^{(1)}(0) & p^{(1)}(1) \end{vmatrix} = \begin{vmatrix} x_0 & x_1 \\ -x_1' & x_0' \end{vmatrix}$$

The first RE may use the precoded data:

$$\begin{vmatrix} p^{(0)}(0) \\ p^{(1)}(0) \end{vmatrix}$$

and the second RE may use the precoded data:

$$\begin{vmatrix} p^{(0)}(1) \\ p^{(1)}(1) \end{vmatrix}.$$

where $x_0$ and $x_1$ refer to modulated data at the eNodeB which could be QPSK, 16-QAM, 64-QAM, or higher M-QAM.

According to certain aspects, a UE may utilize a transformation such that the received SFBC channel may be converted into an equivalent channel with double the number of rows and 2 columns. This transformation may be applied to signals from any cell, whether the cell is serving the UE or interfering with the UE, and whether the cell transmits with or without SFBC. This transformed channel for each cell may be unified into one joint channel and then spatially processed by linear techniques (e.g., Minimum Mean Square Error).

In the description that follows, for matrices, the notation H[a,b] indicates row a column b, H[a,:] indicates row a, and H[:,b] indicates column b. Additionally, a single quote or 'prime' indicates the complex conjugate of a matrix.

According to certain aspects, a UE or any device receiving a signal may process received signals using the following inputs:

$H_{serve,first}$=Serving channel first RE, e.g. the channel condition from the serving cell during a first resource element.

$H_{serve,second}$=Serving channel second RE, e.g. the channel condition from the serving cell during a second resource element.

$H_{int(c),first}$=Interfering cell c channel first RE, e.g. the channel condition from interfering cell c during a first resource element.

$H_{int(c),second}$=Interfering cell c channel second RE, e.g. the channel condition from interfering cell c during a second resource element.

$H_{serve,despat,first}$=Serving despatialized channel first RE, e.g. the despatialized channel condition from the serving cell during a first resource element.

$H_{serve,despat,second}$=Serving despatialized channel second RE, e.g. the despatialized channel condition from the serving cell during a second resource element.

$H_{int(c),despat,first}$=Interfering cell c despatialized channel first RE, e.g. the despatialized channel condition from interfering cell c during a first resource element.

$H_{int(c),despat,second}$=Interfering cell c despatialized channel second RE, e.g. the despatialized channel condition from interfering cell c during a second resource element.

$y_{first}$=Tones first RE, e.g. the tones received during a first resource element.

$y_{second}$=Tones second RE, e.g. the tones received during a second resource element.

In the above inputs, despatialized means the channel matrix has already been multiplied by the precoding matrix.

According to certain aspects, a UE may process received signals and produce the following outputs:

$H_{joint}$=Joint Channel (6×4), for example, e.g. a joint channel matrix.

$y_{joint}$=Joint Tones (4×1), for example, e.g. a joint tones matrix.

Example Channel Joining

Figure 6A:
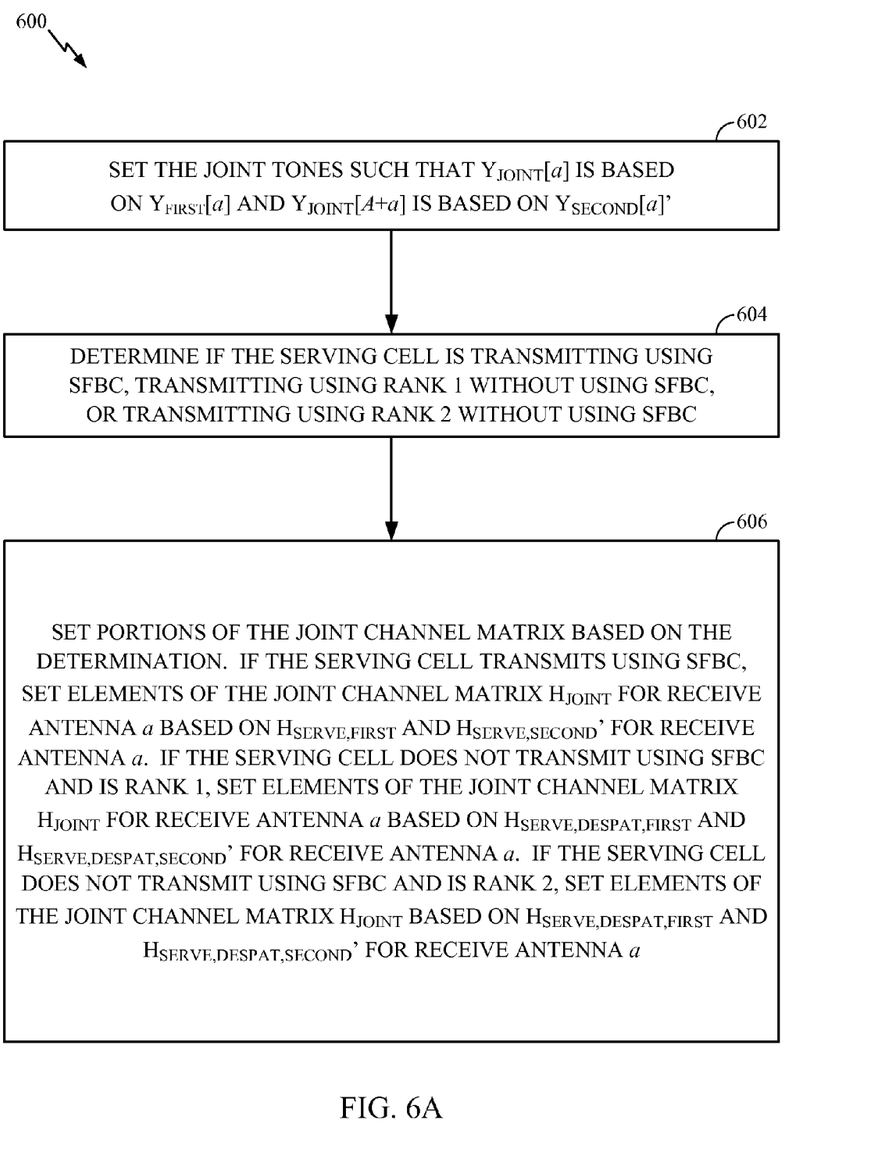
FIGS. 6A and 6B illustrates exemplary operations to perform channel joining, in accordance with aspects of the present disclosure.

FIG. 6A illustrates exemplary operations 600 to perform channel joining, according to certain aspects of the present disclosure. The operations may be performed by a UE, for example. According to certain aspects, the serving and interfering channels may be joined into one channel through the following steps. These steps may be repeated for each of A antennas utilized by a UE. The antennas are denoted a, which ranges from 0 to A−1.

At 602, the UE may set the joint tones such that $y_{joint}[a]$ is based on $y_{first}[a]$ and $y_{joint}[A+a]$ is based on $y_{second}[a]'$ (e.g., the complex conjugate of $y_{second}[a]$). At 604, the UE may determine if the serving cell is transmitting using SFBC, transmitting using rank 1 without using SFBC, or transmitting using rank 2 without using SFBC. At 606, the UE may set portions of the joint channel matrix based on the determination.

If the serving cell transmits using SFBC, the UE may set elements of the joint channel matrix $H_{joint}$ for receive antenna a based on $H_{serve,first}$ and $H_{serve,second}'$ for receive antenna a, for example. If the serving cell does not transmit using SFBC and is rank 1, the UE may set elements of the joint channel matrix $H_{joint}$ for receive antenna a based on $H_{serve,despat,first}$ and $H_{serve,despat,second}'$ for receive antenna a, for example. If the serving cell does not transmit using SFBC and is rank 2, the UE may set elements of the joint channel matrix $H_{joint}$ based on $H_{serve,despat,first}$ and $H_{serve,despat,second}'$ for receive antenna a, for example.

Figure 6B:
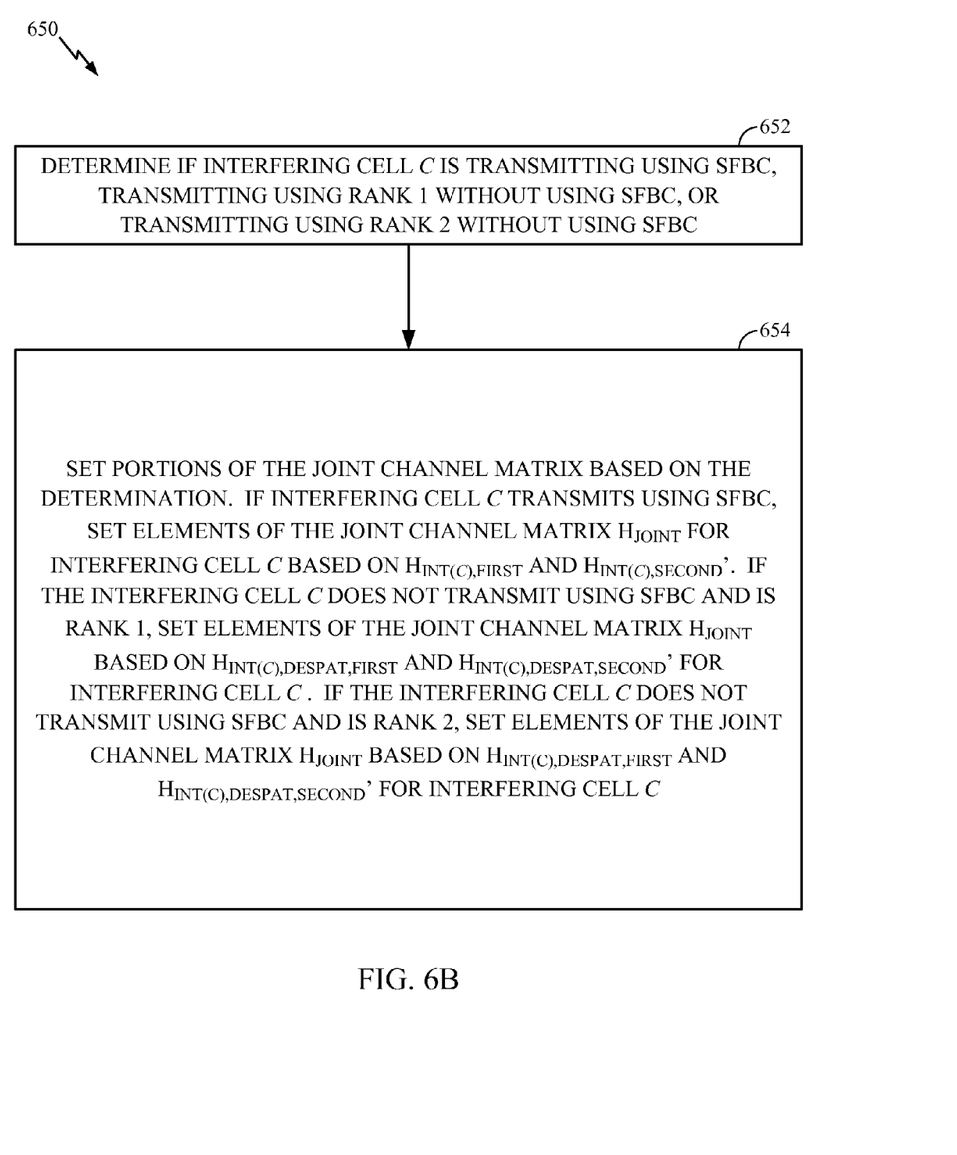

FIG. 6B illustrates exemplary operations 650 to perform channel joining, according to certain aspects of the present disclosure. The operations may be performed by a UE, for example. According to certain aspects of the present disclosure, a UE performing channel joining may perform exemplary operations 650 in addition to performing exemplary operations 600. The operations 650 may be repeated for each interfering cell c, where c ranges from 0 to the number of interfering cells minus one.

At 652, a UE may determine if interfering cell c is transmitting using SFBC, transmitting using rank 1 without using SFBC, or transmitting using rank 2 without using SFBC. At 654, the UE may set portions of the joint channel matrix based on the determination.

If interfering cell c transmits using SFBC, the UE may set elements of the joint channel matrix $H_{joint}$ for interfering cell c based on $H_{int(c),first}$ and $H_{int(c),second}'$ for interfering cell c, for example. If interfering cell c does not transmit using SFBC and is rank 1, the UE may set elements of the joint channel matrix $H_{joint}$ for interfering cell c based on $H_{int(c),despat,first}$ and $H_{int(c),despat,second}'$ for interfering cell c, for example. If interfering cell c does not transmit using SFBC and is rank 2, the UE may set elements of the joint channel matrix $H_{joint}$ for interfering cell c based on $H_{int(c),despat,first}$ and $H_{int(c),despat,second}'$ for interfering cell c, for example.

According to certain aspects, portions of the joint channel matrix which are not explicitly set to any value based on the operations 600 and 650 may be set to zero, for example.

According to certain aspects, it is possible for the serving and/or interfering cells to be non-SFBC. In those cases, the channels are independent across REs, and the joint channel matrix models the independence of the REs by using zero values, for example, in the portions of the joint channel matrix representing channel correlation between REs.

Figure 7:
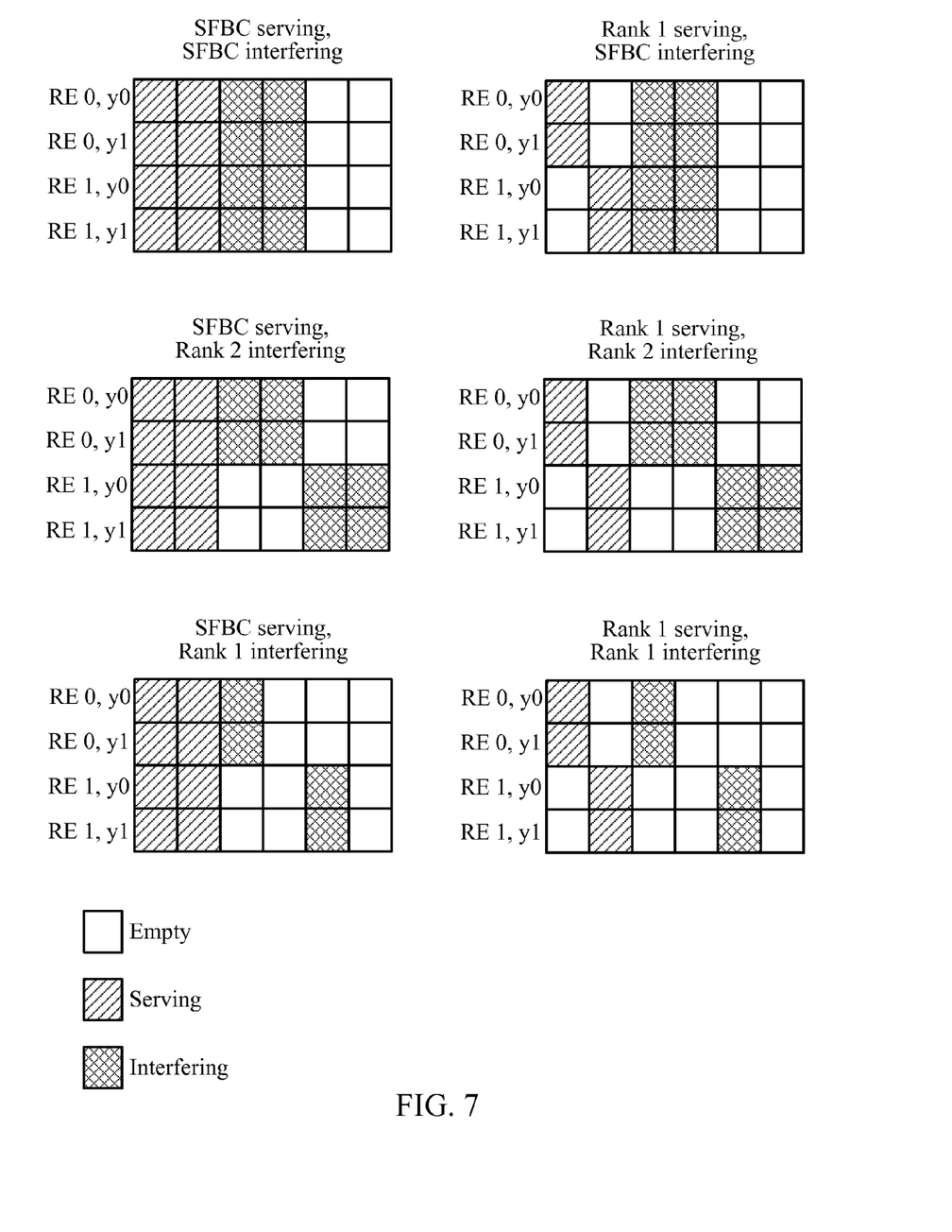
FIG. 7 illustrates examples of joining channels of one serving and one interfering cell, in accordance with aspects of the present disclosure.

FIG. 7 illustrates examples of joining channels of one serving and one interfering cell. According to certain aspects of the present disclosure, a device (e.g. a UE) may calculate a joint channel matrix with certain cells based on channel values of a serving cell, and other cells based on channel values of an interfering cell. As illustrated in FIG. 7, some cells of the joint channel matrix may be empty (e.g., set to zero), depending on the transmission characteristics of a serving cell and an interfering cell. The cells of the exemplary matrices are labeled RE 0 and RE 1 to indicate whether each cell applies to a first resource element or a second resource element. Similarly, the cells are labeled y0 and y1 to indicate whether each cell applies to a first tone or a second tone.

Figure 8:
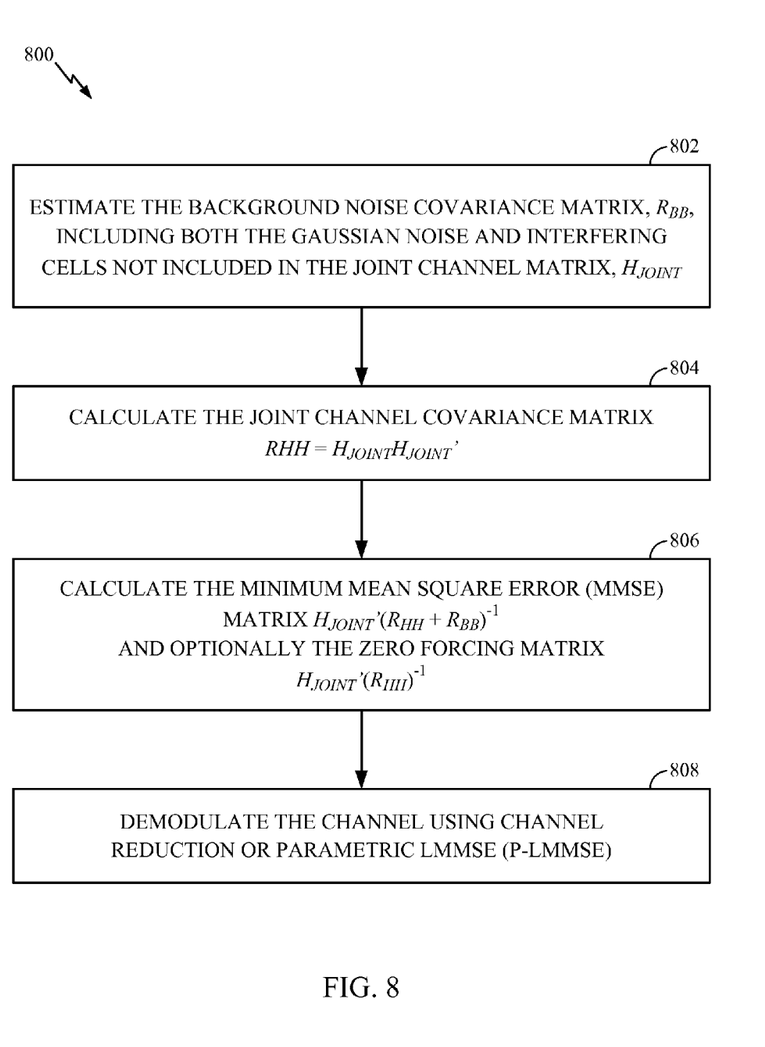
FIG. 8 illustrates exemplary operations to perform joint spatial processing, in accordance with aspects of the present disclosure.

FIG. 8 illustrates exemplary operations 800 to perform joint spatial processing on the joint channel, in accordance with aspects of the present disclosure. The operations 800 may be performed by a UE, for example.

At 802, the UE may estimate the background noise covariance matrix, $R_{BB}$, including both the Gaussian noise and interfering cells not included in the joint channel matrix, $H_{joint}$. At 804, the UE may calculate the joint channel covariance matrix $R_{HH}=H_{joint}H_{joint}'$. At 806, the UE may calculate the Minimum Mean Square Error (MMSE) matrix $H_{joint}'(R_{HH}+R_{BB})^{-1}$, and additionally or alternatively, the zero forcing matrix $H_{joint}'(R_{HH})^{-1}$. At 808, the UE may demodulate the channel, for example, using Channel Reduction or Parametric LMMSE (p-LMMSE).

According to certain aspects of the present disclosure, Channel Reduction may be an algorithm that transforms a channel into a reduced dimension channel (e.g., while retaining the performance of the original channel). Using channel reduction, any channel may be demodulated with any demapper. For example, a channel reduction algorithm may transform a 2×3 channel such that the channel may be demodulated with a 2×2 demapper. In the example, the 2×3 channel may include a rank-1 serving channel and a rank-2 interfering channel, and the channel may span one resource element (RE).

According to certain aspects of the present disclosure, p-LMMSE means parametric MMSE followed by rank-1 demodulation. The parametric MMSE matrix may be calculated using information regarding the channel from the serving cell and zero or more interfering cells.

Figure 9:
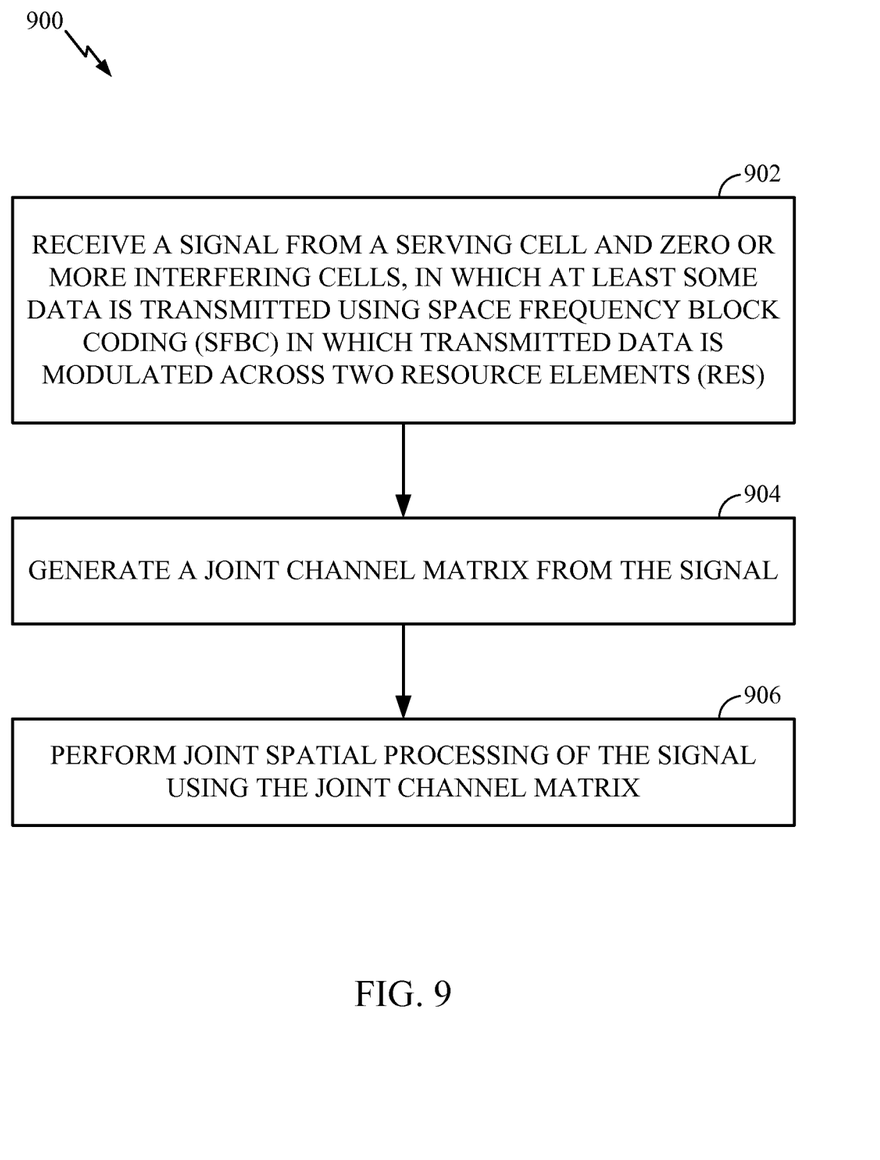
FIG. 9 illustrates example operations to perform joint spatial processing, in accordance with aspects of the present disclosure.

FIG. 9 illustrates example operations 900 to perform joint spatial processing that may be performed, for example, by a user equipment (UE), utilizing concepts presented herein. The operation 900 begin, at 902, by receiving a signal from a serving cell and zero or more interfering cells.

At 904, the UE generates a joint channel matrix from the signal, wherein the matrix accommodates a signal in which at least some data is transmitted using Space Frequency Block Coding (SFBC) in which transmitted data is modulated across two Resource Elements (REs). At 906, the UE performs joint spatial processing of the signal using the joint channel matrix. In aspects, the received signal from a serving cell and zero or more interfering cells may include at least some data transmitted using Space Frequency Block Coding (SFBC) in which transmitted data is modulated across two Resource Elements (REs).

According to certain aspects of the present disclosure, generating the joint channel matrix may comprise determining whether the serving cell transmitted using Space Frequency Block Coding (SFBC) and calculating one or more values of the joint channel matrix based at least in part on the determination of whether the serving cell transmitted using SFBC. For example, a UE may determine that the UE's serving cell transmitted using SFBC and determine to set values in the first two columns of the joint channel matrix equal to values in the serving cell's channel matrix. According to these aspects, generating the joint channel matrix may comprise calculating one or more values of the joint channel matrix based at least in part on a channel matrix of the serving cell. According to aspects, generating the joint channel matrix may comprise determining whether an interfering cell transmitted using Space Frequency Block Coding (SFBC) and calculating one or more values of the joint channel matrix based at least in part on the determination of whether the interfering cell transmitted using SFBC. In the example, the UE may determine that an interfering cell transmitted using SFBC and determine to set values in the third and fourth columns of the joint channel matrix equal to values in the channel matrix of the interfering cell. According to aspects, generating the joint channel matrix may comprise calculating one or more values of the joint channel matrix based at least in part on a channel matrix of the interfering cell.

According to certain aspects of the present disclosure, joint spatial processing may comprise calculating the joint channel covariance matrix. According to aspects, joint spatial processing may comprise calculating a Minimum Mean Square Error (MMSE) matrix based at least on the joint channel covariance matrix and demodulating the signal, for example, using channel reduction, based at least on the Minimum Mean Square Error (MMSE) matrix.

Alternatively, joint spatial processing may comprise calculating a Minimum Mean Square Error (MMSE) matrix based at least on the joint channel covariance matrix and demodulating the signal using, for example, parametric LMMSE, based at least on the Minimum Mean Square Error (MMSE) matrix.

According to aspects of the present disclosure, a UE may cancel interference in a received signal to more accurately detect the transmitted signal. According to aspects, the UE may receive and process the interfering signal to determine symbols in the interfering signal, and cancel the determined symbols from the received signal. This may be referred to as symbol level interference cancellation (SLIC).

According to aspects of the present disclosure, a UE may perform blind spatial scheme detection to identify whether the interfering cell is transmitting using SFBC or without using SFBC. Given the uncertainty of spatial scheme of the interfering signal, a receiver may treat each resource element independently when processing the incoming signal. Such processing may include performing MMSE operations to suppress another cell's signal when trying to identify a spatial scheme of one or more interfering cells. Such operations may treat each RE independently when performing MMSE operations, and an SFBC structure may not be utilized explicitly.

According to aspects of the present disclosure, a UE may process two REs together, where those two REs are related through SFBC encoding if an SFBC spatial scheme is used. For example, in the case of a 2×2 system (e.g., an interfering transmitter having two Tx antennas and a receiver having two Rx antennas), a 4×4 processing scheme may be used for each pair of REs when the hypothesis is SFBC. In the example, the inter-layer interference may be reduced and/or minimized.

Figure 10:
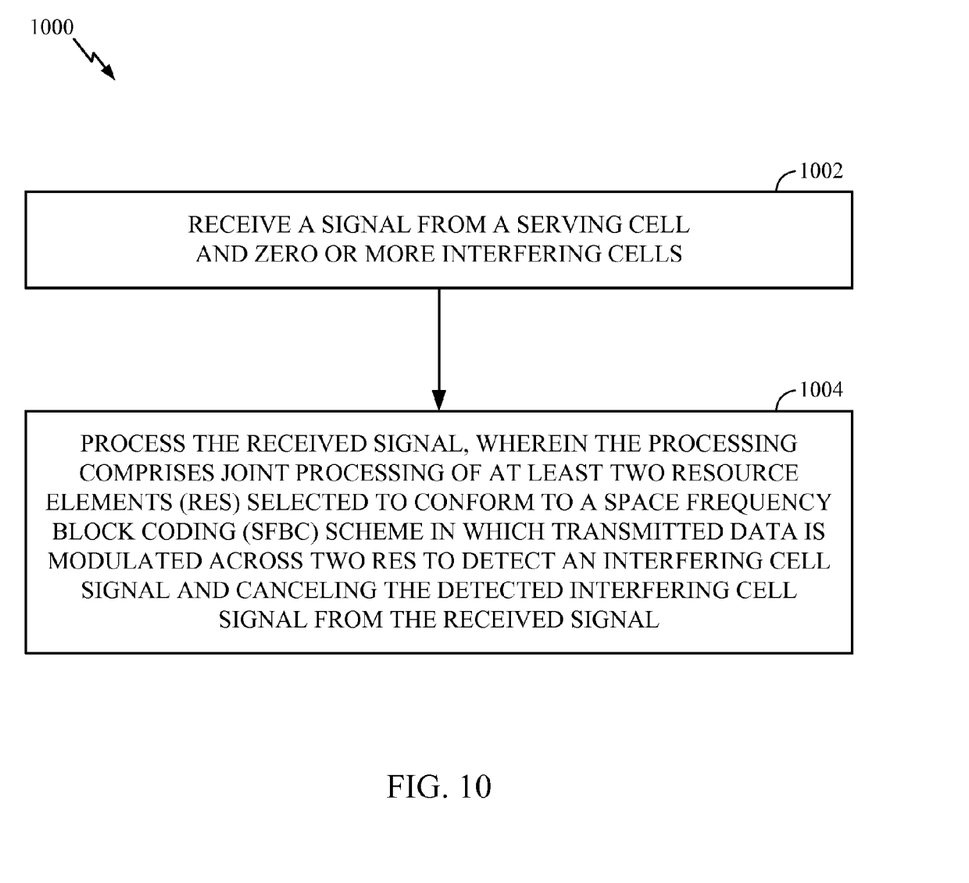
FIG. 10 illustrates example operations to perform joint spatial processing, in accordance with aspects of the present disclosure.

FIG. 10 illustrates exemplary operations 1000 to perform joint spatial processing for performing symbol level interference cancellation by processing two REs together, according to aspects of the present disclosure. The operations 1000 may be performed by a UE, for example. At 1002, the UE may receive a signal from a serving cell and zero or more interfering cells. At 1004, the UE may process the received signal, wherein the processing includes joint processing of at least two Resource Elements (REs), selected to conform to a Space Frequency Block Coding (SFBC) scheme in which transmitted data is modulated across two REs, to detect an interfering cell signal and canceling of the detected interfering cell signal from the received signal.

According to aspects of the present disclosure, the processing may comprise determining whether one or more interfering cells uses an SFBC scheme based on blind spatial scheme detection. According to aspects, the canceling of the detected interfering cell signal may comprise reconstructing the signal of an interfering cell based on a determination that the interfering cell used an SFBC scheme and canceling the reconstructed signal from the received signal.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a user equipment (UE), comprising:
   receiving a signal from a serving cell and zero or more interfering cells;
   generating a joint channel matrix from the signal, wherein the matrix accommodates a signal in which at least some data is transmitted using Space Frequency Block Coding (SFBC) in which transmitted data is modulated across two Resource Elements (REs), and wherein generating the joint channel matrix comprises determining whether the serving cell transmitted using the SFBC and calculating one or more values of the joint channel matrix based at least in part on the determination of whether the serving cell transmitted using the SFBC; and
   performing joint spatial processing of the signal using the joint channel matrix.

2. The method of claim 1, wherein generating the joint channel matrix further comprises: calculating the one or more values of the joint channel matrix based at least in part on a channel matrix of the serving cell.

3. The method of claim 2, wherein generating the joint channel matrix further comprises: determining whether an interfering cell transmitted using the SFBC and calculating one or more values of the joint channel matrix based at least in part on the determination of whether the interfering cell transmitted using the SFBC.

4. The method of claim 3, wherein generating the joint channel matrix further comprises: calculating the one or more values of the joint channel matrix based at least in part on a channel matrix of the interfering cell.

5. The method of claim 1, wherein joint spatial processing comprises:
   calculating the joint channel covariance matrix.

6. The method of claim 5, wherein joint spatial processing further comprises:
   calculating the Minimum Mean Square Error (MMSE) matrix based at least on the joint channel covariance matrix; and demodulating the signal based at least on the Minimum Mean Square Error (MMSE) matrix.

7. The method of claim 6, wherein demodulating the signal based at least on the MMSE matrix includes using parametric Linear Minimum Mean Square Error (LMMSE).

8. A method for wireless communications by a user equipment (UE), comprising:
   receiving a signal from a serving cell and zero or more interfering cells; and
   processing the received signal, wherein the processing includes joint processing of at least two Resource Elements (REs), selected to conform to a Space Frequency Block Coding (SFBC) scheme in which transmitted data is modulated across the two REs, to detect an interfering cell signal, determining whether one or more of the interfering cells uses the SFBC scheme based on a blind spatial scheme detection, and canceling of the detected interfering cell signal from the received signal based on the determination of whether one or more of the interfering cells uses the SFBC scheme.

9. The method of claim 8, wherein:
the canceling of the detected interfering cell signal comprises reconstructing the interfering cell signal based on a determination that the interfering cell used the SFBC scheme, and canceling the reconstructed signal from the received signal.

10. An apparatus for wireless communications, comprising:
a processor configured to:
receive a signal from a serving cell and zero or more interfering cells;
generate a joint channel matrix from the signal, wherein the matrix accommodates a signal in which at least some data is transmitted using Space Frequency Block Coding (SFBC) in which transmitted data is modulated across two Resource Elements (REs), and wherein generating the joint channel matrix comprises determining whether the serving cell transmitted using the SFBC and calculating one or more values of the joint channel matrix based at least in part on the determination of whether the serving cell transmitted using the SFBC; and
perform joint spatial processing of the signal using the joint channel matrix; and
a memory coupled to the processor.

11. The apparatus of claim 10, wherein the processor is configured to generate the joint channel matrix by calculating the one or more values of the joint channel matrix based at least in part on a channel matrix of the serving cell.

12. The apparatus of claim 11, wherein the processor is configured to generate the joint channel matrix by determining whether an interfering cell transmitted using the SFBC and calculating the one or more values of the joint channel matrix based at least in part on the determination of whether the interfering cell transmitted using the SFBC.

13. The apparatus of claim 12, wherein the processor is configured to generate the joint channel matrix by calculating the one or more values of the joint channel matrix based at least in part on a channel matrix of the interfering cell.

14. The apparatus of claim 10, wherein the processor is configured to perform joint spatial processing by calculating the joint channel covariance matrix.

15. The apparatus of claim 14, wherein the processor is configured to perform joint spatial processing by calculating the Minimum Mean Square Error (MMSE) matrix based at least on the joint channel covariance matrix; and demodulating the signal based at least on the Minimum Mean Square Error (MMSE) matrix.

16. The apparatus of claim 15, wherein demodulating the signal based at least on the MMSE matrix includes using parametric Linear Minimum Mean Square Error (LMMSE).

17. An apparatus for wireless communications, comprising:
a processor configured to:
receive a signal from a serving cell and zero or more interfering cells; and
process the received signal, wherein the processing includes joint processing of at least two Resource Elements (REs), selected to conform to a Space Frequency Block Coding (SFBC) scheme in which transmitted data is modulated across the two REs, to detect an interfering cell signal, determining whether one or more of the interfering cells uses the SFBC scheme based on a blind spatial scheme detection, and canceling of the detected interfering cell signal from the received signal based on the determination of whether one or more of the interfering cells uses the SFBC scheme; and
a memory coupled to the processor.

18. The apparatus of claim 17, wherein to cancel the detected interfering cell signal, the processor is configured to:
reconstruct the interfering cell signal based on a determination that the interfering cell used the SFBC scheme, and cancel the reconstructed signal from the received signal.

* * * * *